United States Patent
Takeda et al.

[11] 4,037,919
[45] July 26, 1977

[54] HOLOGRAPHIC DEVICE WITH DIVIDED OBJECT BEAMS, A MULTICOLOR LIGHT SOURCE AND DIRECTION-SELECTIVE SCREEN

[75] Inventors: Yasutsugu Takeda, Kokubunji; Yoshito Tsunoda, Hachioji, both of Japan

[73] Assignee: Hitachi, Ltd., Japan

[21] Appl. No.: 576,460

[22] Filed: May 12, 1975

Related U.S. Application Data

[63] Continuation of Ser. No. 398,550, Sept. 18, 1973, abandoned.

[30] Foreign Application Priority Data

Sept. 19, 1972 Japan .................................. 47-94032
Feb. 19, 1973 Japan .................................. 48-19879

[51] Int. Cl.$^2$ .......................... G03H 1/16; G03H 1/30
[52] U.S. Cl. .................................................. 350/3.5
[58] Field of Search ........................ 350/3.5, 162 SF

[56] References Cited

U.S. PATENT DOCUMENTS 3,746,783  7/1973  Gerritsen et al. ...................... 350/3.5

OTHER PUBLICATIONS

Okoshi et al., Optics Comm., vol. 3, No. 2, pp. 85-88, Apr. 1971.
Fukumori et al., Appl. Optics, vol. 10, No. 3, pp. 482-489, Mar. 1971.

*Primary Examiner*—John K. Corbin
*Assistant Examiner*—Jon W. Henry
*Attorney, Agent, or Firm*—Craig & Antonelli

[57] ABSTRACT

A holographic device comprises a film for displaying a three-dimensional object as images, each of which is obtained as viewed in a respective one of a plurality of different directions, a phase plate for providing a light beam for illuminating each of said images of the film with an additional phase at random, a sampling grating for dividing a light beam from the phase plate into a plurality of small groups of light beams, a photosensitive material, and a slit for simultaneously radiating said light beam and a light beam having coherency therewith on each position of said photosensitive material in succession.

2 Claims, 9 Drawing Figures

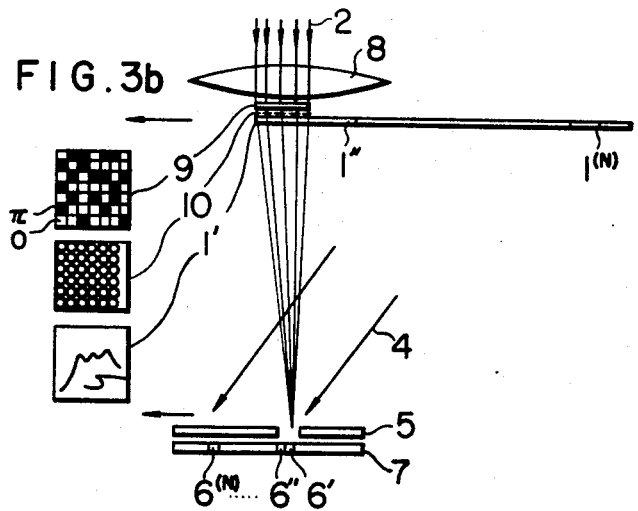
FIG. 3a
FIG. 3b
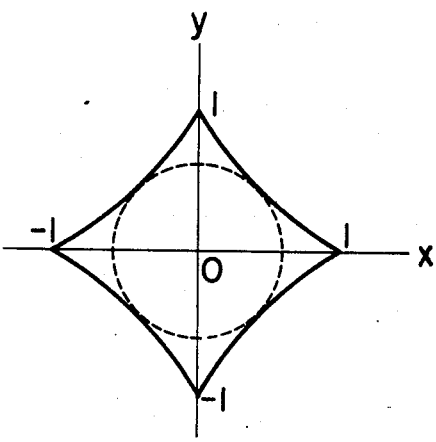
FIG. 4

HOLOGRAPHIC DEVICE WITH DIVIDED OBJECT BEAMS, A MULTICOLOR LIGHT SOURCE AND DIRECTION-SELECTIVE SCREEN

This is a continuation of application Ser. No. 398,550 filed Sept. 18, 1973 and now abondoned.

The present invention relates to a holographic device in which three-dimensional information is recorded as a hologram on a recording medium, and more particularly to a hologram recording device in which minimum possible informational light necessary for recognition of the information is sampled from the three-dimensional information for hologram recording. The disadvantage of the prior art and the feature of the present invention thereover will be apparent from the following detailed description taken in conjunction with the accompanying drawings, in which:

FIGS. 3a and 3b are views for illustrating an embodiment of a hologram recording device according to the present invention;

FIG. 4 is an illustrative view of operation and effect due to another embodiment according to the present invention;

Figure 1:
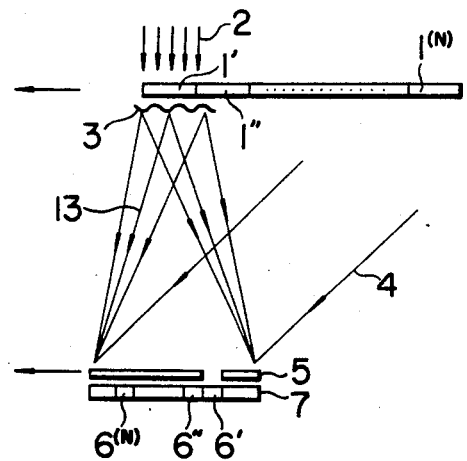
FIG. 1 is an illustrative view of a conventional composite hologram recording device.

It is known that holographic techniques have been used for three-dimensional information recordings, but they have not always been the techniques for general use because there are many limitations in the holographic techniques: an object has its dimension limited to an extent that it can be illuminated by a laser beam; the object should be stationary; and a photograph thereof must be taken in a dark room. In order to overcome the conventional holographic techniques there has been proposed a technique called composite holography.

The prior-art embodiment of this technique will be described in connection with FIG. 1.

A three-dimensional object is first photographed in a plurality of different directions under usual illumination such as natural light to prepare a plurality of photographic film sections on which two-dimensional pictorial informations is recorded. In FIG. 1 a plurality of the film sections are indicated by $1'$, $1''$, $-1^{(N)}$ where N is a positive integer number more than two. At first, a first film section $1'$ is illuminated by a laser lightwave 2. In the proximity of the film there is disposed a light diffusing plate 3 such as a frosted glass for causing the laser lightwave passing through the film section $1'$ to be converted to a diffused lightwave 13 to provide substantially uniform orientation toward a recording medium 7. It is to be noted that a reference lightwave 4 having coherency with the diffused lightwave 13 is also substantially uniformly oriented toward the recording medium 7 at a predetermined angle therewith. At a position of the recording medium 7 on the side of the film there is disposed a movable slit 5, only on which holograms resulting from interference of the diffused lightwave 13 with the reference lightwave 4 are formed.

The photographic film is displaced in the direction of the upper arrow so that the film sections $1'$, $1''$, $-1^{(N)}$ may appear in succession to prepare holograms $6'$, $6''$, $-6^{(N)}$ in association with the displacement of the slit 5 in the direction of the lower arrow. It will be apparent that the hologram $6'$ includes therein the two-dimensional image information of the film section $1'$, the hologram $6''$ the two-dimensional image information of the film section $1''$ and the hologram $6^{(N)}$ the two-dimensional image information of the film section $1^{(N)}$. Thus, a plurality of two-dimensional information images obtained from the photograph of the three-dimensional object in the different directions are recorded as the holograms on the recording medium with their centers disposed thereon in separated relation to each other. The simultaneous reproduction of the holograms by the use of the laser lightwave permits the perspective information of the three-dimensional object to be recognized by unaided human eyes at different angles depending upon their position with as much effect as one substantially views the image of the three-dimensional object.

Figure 2:
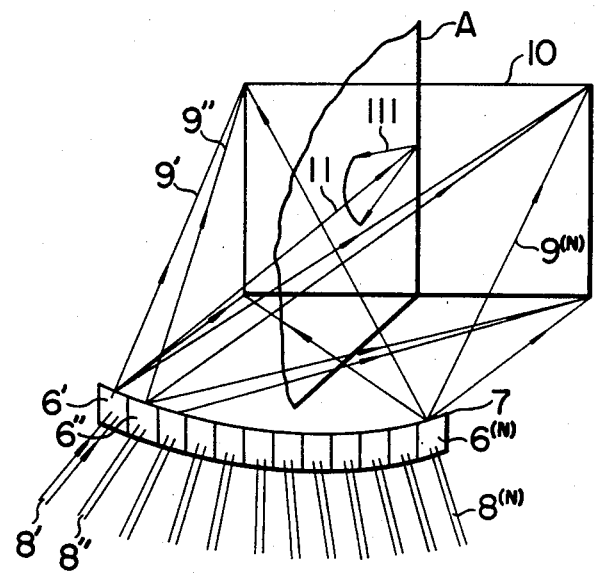
FIG. 2 is an illustrative view of a composite hologram reproducing device.

FIG. 2 shows a device for reproducing such a composite hologram in which reference numerals $6'$, $6''$, $-6^{(N)}$ and 7 indicate the same elements as those in FIG. 1. Laser beams $8'$, $8''$, $-8^{(N)}$ are directed on the respective holograms $6'$, $6''$, $-6^{(N)}$ at an angle of incidence equal to that upon preparation of the holograms. Lightwaves reproduced from the respective holograms are indicated by $9'$, $9''$, $-9^{(N)}$.

A screen 10 fixed vertically serves as a direction-selective screen which scatters an incident light beam 11 only onto a vertical plane. A including therein the incident light beam 11, so that a scattered light beam 111 will propogate in the vertical plane A. It is well known that the screen of this kind can be obtained by a lenticular plate in combination with a frosted glass, for example it is disclosed in "THREE-DIMENSIONAL IMAGE ENGINEERING" written by Takanori Ookoshi, published by Sangyo Tosho Publishing Co., Ltd., in 1972.

The application of the conventional composite hologram as mentioned above provides an excellent technique by which a tremendous amount of information essentially required in recording all the information from the three-dimensional object is provided with a sampling to produce the finite number of two-dimensional image information for hologram recordings, thereby permitting the recording of the three-dimensional objects such as outdoor objects or persons about which it was impossible to prepare the hologram under the direct illumination of the laser.

Conventionally, however, there is disclosed no reasonable technique for making sufficiently small the area of each hologram shown by $6'$, $6''$, $-6^{(N)}$, so that the recording medium requires a very large area as a whole with the result as an obstacle from a practical point of view. For example, when a three-dimensional motion picture roll film including the film sections $6'$, $6''$, $-$, $6^{(N)}$ in each frame is to be prepared, the area of one frame amounts to as large as 20 square centimeters as compensation for low resolution power due to the technique, leading to a large-sized overall device impractical from an economical point of view.

Accordingly, an object of the present invention is to provide a holographic device for effecting a hologram recording of information from a three-dimensional object with high density. Another object of the present invention is to provide a holorgraphic device for effecting a hologram recording of information from a three-dimensional color object with high density.

A still further object of the present invention is to provide a holographic device for reproducing information with high density.

In order to attain the above-mentioned objects, the present invention provides a holographic device in which a plurality of two-dimensional information obtained from a three-dimensional object as viewed in a plurality of directions are stored and displayed, and light beams are modulated in response to the two-dimensional image informations and divided into a plurality of small groups of light beams for hologram recordings with the aid of the modulated and divided light beams in cooperation with a light beam having coherency therewith.

The essential reason why the areas required for holograms are necessarily made large in the conventional devices exists in the fact that an attempt is made to record as a hologram all of the two-dimensional informations from the film sections $1'$, $1''$, -, $1^{(N)}$. Originally, in the composite hologram the sampling of information is effected by taking photographs of the three-dimensional object in finite directions. The principle of the present invention is, therefore, to remove from the informational light unnecessary components thereof once more to record only minimum possible necessary information in making holograms of the two-dimensional image information.

In order to realize the principle, the present invention is intended to modulate light beams in dependence on the two-dimensional image information and to divide the thus modulated light beams into a plurality of small groups of light beams for hologram recordings with the aid of the modulated and divided light beams in cooperation with a light beam having coherency therewith. The minimum possible necessary information is further recorded in such a way that: the small groups of light beams have their phase changed at random at least in a two-step manner; the informational light containing therein a plurality of the two-dimensional image information is focused on a recording meduim through a hole of a movable slit by a lens or curved mirror; and the energies on the focus of the informational light are distributed in separated relation to each other.

A particular embodiment according to the present invention is shown in FIG. 3a in which reference numerals $1'$, $1''$, -, $1^{(N)}$, 2, 4, 5, $6'$, $6''$, -, $6^{(N)}$ and 7 indicate the same components as those in FIG. 1. In this embodiment, the laser lightwave 2 is formed to a converging lightwave by a lens 8, passing through a sheet of film $1'$ (shown in FIG. 3b) containing therein the two-dimensional image information toward an optical axis of the lens on the recording medium 7. In the present embodiment, the light beam passing through the film is adapted to further pass through a two-dimensional matrix-like phase plate 9 (shown in FIG. 3b) divided in columns and rows and including therein unitary domains which are different in thickness and irregularly disposed thereon. The phase plate itself is well known, and a phase shift occurring when the light beam passes through each unitary domain of the matrix-like phase plate is selected quite at random, the absolute value of the phase shift being adapted to take, for example, two step values such as 0 or $\pi$. The light, after passing through the matrix-like phase plate 9, then passes through a grating 10 (shown in FIG. 3b) on which circular holes are arranged in a matrix form. The circular holes are adapted to pass therethrough the light wave which is divided by the phase plate 7 and passes through a central portion of each unitary domain. Thereafter, the light beam passes through the film $1'$ and becomes a lightwave containing information. Thus, it will be appreciated that informational light of the two-dimensional image information in the film $1'$ which overlies no circular hole is removed therefrom. In other words, the information undergoes a sampling. From the principle of a shadow mask employed in a color cathode ray tube in a color television receiver set, one can sufficiently experimentally appreciate that the increased matrix number of the circular holes permits the sampled information to be viewed as remaining unchanged as compared with the original information. In this respect, accordingly, it can be concluded that as the number of circular holes is increased better information can be obtained. However, the an increase in the number of the sampling relative to the film having a given area results in a small diameter d of the circular hole. According to an optical theory, however, it is stated that if the lightwave passing through the circular hole having a diameter d is focused by a lens having a focal length $f$, then the distributed lightwave has its diameter of an effective value dH which is inversely proportional to d as seen from expression (1)

$$d_H = 2.44 \times f\lambda/d \tag{1}$$

where $\lambda$ is the wavelength of the lightwave. It is a matter of self-evidence that $d_H$ is substantially equal to the diameter of the hologram $6'$ to be prepared. Thus, it will be appreciated from the expression that to make the diameter $d$ small unnecessarily is disadvantageous. After all, taking into consideration the resolution power of the human eye, it is concluded that it is quite unnecessary to set the diameter $d$ to a value smaller than a possible resolution power limit of the information. The possible resolution power limit is defined as a distance of 0.1mm where the information is viewed by the human eyes spaced apart 25 centimeters therefrom. The small light beams passing through the circular holes and the film are provided with the corresponding additional phase at random, so that at lens-focused positions there by no means appears any further local spectrum, that is, concentration in the distribution of the informational light beam. Thus, practically, the hologram can be made, within theoretical limits as small as possible, and is prepared on the basis of the resolution power of the human eye, the wavelength of the laser beam, the focal length of the lens, etc. being chosen accordingly. When the film is displaced to the section $1''$, the lens 8 and the slit 5 are shifted in the direction of the arrows by an amount substantially equal to the diameter of the hologram to effect an new exposure for writing operation of the holorgram $6''$. In the following, the similar operations are repeated to write-in the contents of the two-dimensional image information from the film section $1^{(N)}$ to the hologram $6^{(N)}$ whereupon one frame of composite hologram is completed.

Next, the effects of the present invention will be described quantitatively by way of exemplary values.

Thirty sheets of two-dimensional image information obtained from the photograph of a three-dimensional object in a lateral direction across the object at different angles within a visual angle of 60° are recorded on film strips of about 50 by 50 millimeters, respectively. These film strips are superimposed on the grating on which 500 by 500 circular holes 0.1 millimeters in diameter are closely arranged in matrix form, and then superimposed on the phase plate made of a cerium oxide film on a glass substrate and prepared so that 500 by 500 of unitary domains may be arranged thereon in the matrix form at random according to a random number table so as to provide the lightwave with an additional phase displacement of 0 or $\pi$. The lightwave is focused by a lens having a focal length of 75 millimeters on the recording medium such as dichromate gelatin disposed at the focus thereof to prepare the hologram under the interference of the above-mentioned object light with a reference light beam intersecting therewith at an angle of about 30°. For the laser there may be used a helium-cadmium laser having a wavelength of 442 nanometers. In this case, each hologram has a diameter of 0.8 millimeters. Thirty sheets of hologram are prepared corresponding to the 30 sheets of two-dimensional image information. The arrangement of these sheets in line eventually provides a sheet having an area of 24 by 0.8 millimeters on which the above-mentioned three-dimensional information is recorded. The area is about one-one hundredth times as large as that of the conventional system mentioned above, thereby permitting not only the economical application of the recording medium but also the miniaturization and economization of the device.

Further, another embodiment will be described to which attention must be paid upon application of the present invention. In the previous embodiment, the two-dimensional image information is divided by the phase plate, and further the grating having the circular holes arranged in equi-spaced relationship is used to remove a portion of image elements therefrom. There is, however, a case where only either the grating or phase plate is sufficient. For example, a phase plate composed of sufficiently small unitary domains each having any one of different phase thicknesses causes the energy of the informational light in the proximity of the focus to be distributed in the form of a star as shown in FIG. 4 when the two-dimensional image information is provided with the additional phase at random in the matrix form. If the hologram is stored so that the area of the hologram may be restricted to a circle inscribed with the star as indicated by a dotted line in FIG. 4, then the information on four corners in the periphery of each unitary domain obtained by the division in the division in the matrix form cannot be reproduced with the same effect as the approximate use of the circular hole.

In the embodiments according to the present invention, the film strips on which the three-dimensional object is photographed in a pluraltiy of different directions are adapted for use as an original picture from which the composite hologram is prepared, but it will be apparent that secondary film strips obtained by conversion such as optical enlargement, reduction and projection or any other recording and displaying means equivalent thereto may be used as the original picture in place of directly using the above-mentioned film strips without any hindrance upon the application of the present invention.

In the above, the present invention has been described only by way of the black and white three-dimensional object having light and dark images, but the present invention is not restricted thereto but may be applicable to a holographic device for recording and reproducing a color image.

Conventionally there has been proposed no technique how color information should be incorporated in the holograms 6', 6'', -, 6$^{(N)}$ to form the three-dimensional color image. When, particularly the technique of the kind is employed in the packaging of three-dimensional video inforation, it is neccessary to store all information concerning one frame of image on the recording medium with the highest reasonable density to make the effective area of the recording medium as small as possible.

The present invention can provide a holographic device fulfilling such a demand.

The principle of the present invention to record and reproduce such three-dimensional color information is as follows: that is, each of a plularity of sheets of two-dimensional color image information obtained from the photographing of the three-dimensional object in a plurality of directions is arranged on the recording medium to form a set of three holograms with their centers disposed separated from each other. In other words, the informations of red, blue and green components are converted to holograms, respectively, which have their center disposed in separated and adjacent relationship. A set of the three holograms are arranged corresponding to the conventional prior-art holograms 6',6'', -, 6$^{(N)}$ in FIG. 1. In the reproduction of the holograms, a plurality of sets of holograms are reproduced on a direction-selective light diffusing screen simultaneously or in a time-sharing manner. That is, paying attention to reproduced light passing through each hologram toward one point of an image to be reproduced, the use of the direction-selective light diffusing screen causes the reproduced light to be arranged to exist in the same plane as the diffused light from the light diffusing screen. In other words, the reproduced light is directed backwards in a direction parallel to a predetermined axis on the screen and diffused in an axial direction normal to the predetermined axis. This permits the color information from the set of three holograms to be observed in superimposed relationship to viewers without giving thereto any obstacles in synthesizing a cubic image by arranging these groups of holograms in a plurality of sets.

The present invention on the basis of the above principle will be described by way of an embodiment.

Figure 5A:
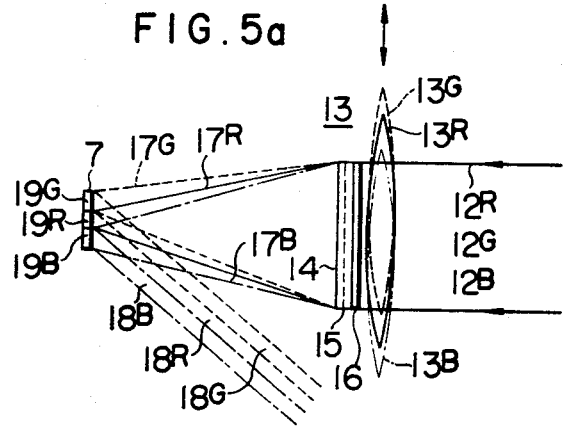
FIGS. 5a and 5b are views for illustrating an embodiment of a color hologram recording device according to the present invention.
Figure 5B:
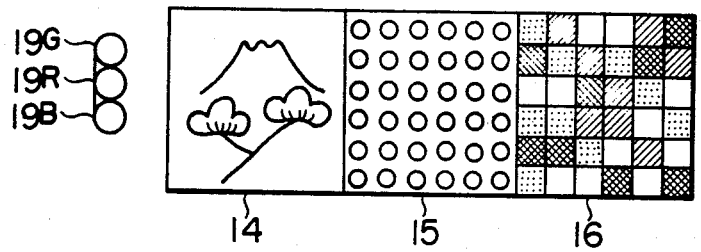
Figure 6:
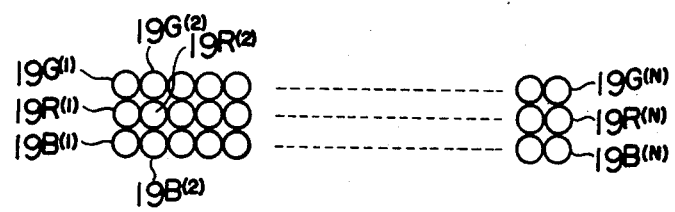
FIG. 6 is a view showing holograms recorded by the device of FIG. 5a in a two-dimensional matrix form.

FIG. 5a shows an arrangement of one embodiment of a hologram recording device according to the present invention. Numeral 14 indicates one frame of a film strip on which one of a plurality of sheets of two-dimensional color image information photographed from the three-dimensional object in a plurality of different directions is recorded. On the frame (shown by 14 in FIG. 5b) there is superimposed a sampling grating 15 (shown in FIG. 5b) for effecting a sampling of information with a pitch above half a period corresponding to a required resolution power. Further there is superimposed a transparent phase plate 16 (shown in FIG. 5c) for providing the light beam passing through each sampling area with the additional phase at random. A unit closely provided with the frame 14, the grating 15 and the plate 16 is disposed on an optical path along which laser beams including three primary colors, 12R(red), 12G(green) and 12B(blue) are focused by a lens 13. The lens has its center displaced in deviated relation: at a position 13R in the illumination of one frame of film 14 by the beam 12R; at a position 13G in the illumination thereof by the beam 13G; and at a position 13B in the illumination by the beam 12B. The laser beams passing through the lens, the sampling grating 15 and the transparent phase plate 16 become converging light beams 17R, 17G and 17B and directed on the recording medium 7 with their centers separated and disposed adjacent to each other. These laser beams are brought into interference with reference light beams 18R, 18G and 18B respectively having coherency therewith with the result of the formation of holograms 19R, 19G and 19B (shown in FIG. 5b) on the recording medium 7. In this case, the diameter $d_{Hi}$ (i indicating R, G, B) of each hologram is given by expression (2)

$$d_{Hi} = 2.44 \times f\lambda i/d_s \qquad (2)$$

where $\lambda i$ (i being R, G, B) is the wavelength of the light beam, f is the distance of the film 14 containing thereon the two-dimensional image information to the recording medium and $d_s$ is the diameter of one hole in the sampling grating. The value of $d_{Hi}$ shows a limit value existing in effecting an optical reduction of one frame of the two-dimensional image for packaging to a given area, and there is no method for compressing the information over the limit value. Assuming that $f = 150$mm, $\lambda i = 0.5\mu m$, $d_s = 100\mu m$, then $d_{Hi} = 1.8$mm. Accordingly, the arrangement of the holograms 19R, 19G and 19B in the proximity of each other permits the elongated side of a set of the holograms to be as small as about 6 millimeters. The above operations are effected relative to the image photographed from a first direction and then relative to those from second to n-th directions, for every time of which the film 14 including the two-dimensional image information is replaced with another and the hologram recording medium 7 is corresponding displaced a predetermined distance in a direction perpendicular to the surface of the drawing. The repetition of these operations by N times results in the formation of a two-dimensional matrix arrangement as shown in FIG. 6.

The holograms $19i^{(1)}$ to $19i^{(N)}$ (i being R, G, B) are not necessarily arranged on the surface of the drawing but may be re-arranged so as to lie on a portion of a cylindrical surface. It is, however, preferable that they may be arranged in such a way that a surface Bi (i being R, G, B) containing a curve which links the centers thereof intersects at right angles with a straight line which links the centers of the holograms 19R, 19G and 19B. The reason will be understood by making reference to a three-dimensional image reproducing device according to the present invention as shown in FIG. 7.

Figure 7:
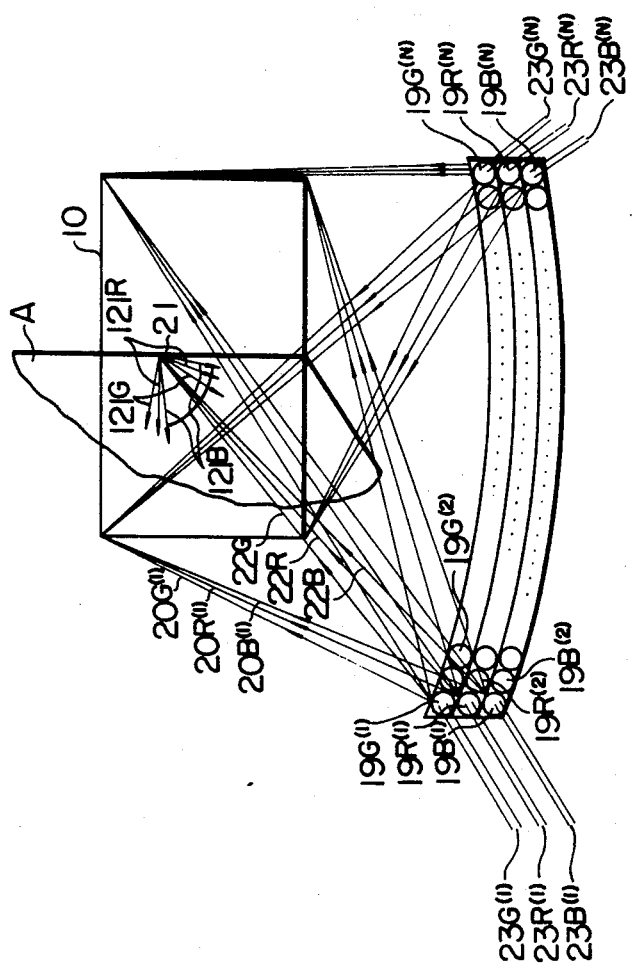
FIG. 7 is a view for illustrating a color hologram reproducing device according to the present invention.

FIG. 7 shows a three-dimensional information reproducing device according to the present invention for forming a three-dimensional color image. In the figure, the same elements as those in FIGS. 1 to 4 show the same or equivalent elements.

In the figure, the holograms $19R^{(1)}$, -, $19R^{(N)}$, $19G^{(1)}$, -, $19G^{(N)}$ and $19B^{(1)}$, -, $19B^{(1)}$, -, $19B^{(N)}$ are reproduced by the laser beams $23R^{(1)}$, -, $23R^{(N)}$, $23G^{(1)}$, -, $23G^{(N)}$ and $23B^{(1)}$, -, $23B^{(N)}$ to radiate the reduced lightwaves $20R^{(1)}$, -, $20R^{(N)}$, $20G^{(1)}$, -, $20G^{(N)}$ and $20B^{(1)}$, -, $20B^{(N)}$, respectively. These reduced lightwaves are imaged on the screen 10 disposed on a surface in which they are focussed. As mentioned previously, the screen 10 fixed vertically serves as a direction selective screen which scatters an incident light beam only in a vertical plane including therein the incident light beam. For convenience, of the description, the screen is assumed to be arranged vertically. Consideration will now be given to reproduced light beams $22R^{(l)}$, $22G^{(l)}$ and $22B^{(l)}$ emanating from the holograms $19R^{(l)}$, $19G^{(l)}$ and $19B^{(l)}$ toward one point 21 on the screen. If, taking into consideration a surface A (in which the reproduced light beams $22R^{(l)}$, $22G^{(l)}$ and $22B^{(l)}$ and diffused to diffused lights 121R, 121G and 121B) containing the light beams and a straight line passing through the point 21 vertically of the surface of the screen, and the screen has its directional reflecting surface such as substantially reflecting the light beam along the plane A, then the image reproduced from a set of the three holograms takes the same role as one of frames 6', 6'', $6^{(N)}$ in FIG. 2 with the color image reproduced in addition thereto. As far as these conditions are guarateed, the overall reproduction of the holograms $19i^{(l)}$, - $19i^{(N)}$ (i being R, G, B) provides the color to the three-dimensional information which is reproduced by the composite hologram reproducing device shown in FIG. 2.

The effect of developing such a three-dimensional information recording and reproducing device for forming the three-dimensional color image is to such an extent as to replace one conventional slide projector with a set of three ultra-small holograms with the area on which information is stored being greatly reduced (1/50 to 1/100 times as reduced as conventionally). This offers new suggestions to the preparation of the three-dimensional motion picture or video package.

In the embodiments according to the present invention, the reproduction of the information is examplified simply in terms of use of the laser beam, in which a red laser beam can be generated by a krypton laser of helium-neon laser, a green laser beam by an argon lasor or secondary gigher harmonic of YAG laser and a blue laser beam by a helium-cadmium laser or argon laser. These are shown only as an example, and the lightwaves are suitably applicable which are produced from not only color element lasers, semiconductor lasers but also lamps of mono spectrum and high brightness such as mercury lamps, xenon lamps or iodine lamps.

Further it will be apparent that the simultaneous reproduction of a plurality of sets of holograms is common but the illuminations thereof in a time-sharing manner may be possible by taking an advantage of an residual image effect of the viewer's unaided eyes.

That is, the simultaneous reproduction is effected in such away that a light beam emanating from each red, green and blue light source for reproduction (not shown) is radiated on each of the three holograms arranged in parallel by means of a plurality of beam splitters. The time-sharing reproduction is, on the other hand, effected in such a way that the red, green and blue light beams are radiated on each three hologram arranged in parallel by means of a rotating mirror (not shown).

What we claim is:

1. A holography apparatus comprising:
   a first recording medium on which are arranged a plurality of two-dimensional multi-color photographic recordings of a three-dimensional object taken from a plurality of different photographic directions;
   first means for providing a plurality of collimated coherent light beams of respectively different monochromaticities;
   second means, disposed in the path of each of said coherent light beams, for separating said beams into respective collimated object beams and reference beams;

a hologram recording medium;

third means comprising a lens for focussing each of said collimated object beams, selectively, through each respective two-dimensional multi-color photographic recording on said hologram recording medium, said object beams thereby converging upon adjacent respective holographic recording areas of said hologram recording medium;

fourth means, disposed in the paths of said respective converging object beams for each respective photographic recording, for dividing each of said converging object beams into a plurality of separated smaller converging beams traveling along the direction of convergence of each respective object beam onto respective adjacent recording areas of said hologram recording medium; and fifth means for directing said respective reference beams onto the adjacent respective holographic recording areas of said hologram recording medium simultaneously with the respective pluralities of separated smaller converging object beams which have been selectively focussed through a respective two-dimensional multi-color photographic recording on said first recording medium, to thereby from respective adjacent holograms of different monochromaticities of the multi-color information carried in a respective two-dimensional multi-color photograph of said three-dimensional object corresponding to a respective one of said different photographic positions on adjacent respective prescribed portions of said hologram recording medium; and further comprising means for reproducing said holograms, said reproducing means including a multi-color light source for illuminating said holograms with multi-color light beams; and a direction-selective screen disposed at an image surface on which multi-color light beams from said multi-color light source having passed through said holograms form reproduced images of the respective holograms.

2. A holography apparatus according to claim 1, wherein a line passing through the center of each respective adjacent hologram, formed for each respective two-dimensional multi-color photograph, is parallel with a predetermined axis on said screen, said predetermined axis being a straight line at which a vertical plane, coplanar with the axis of a light beam having passes through a hologram, intersects said screen.

* * * * *